US008722255B2

(12) United States Patent
Abe et al.

(10) Patent No.: US 8,722,255 B2
(45) Date of Patent: *May 13, 2014

(54) NON-AQUEOUS ELECTROLYTIC SOLUTION FOR LITHIUM SECONDARY BATTERY AND LITHIUM SECONDARY BATTERY USING THE SAME

(75) Inventors: Koji Abe, Yamaguchi (JP); Kazuhiro Miyoshi, Yamaguchi (JP); Takaaki Kuwata, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,791

(22) Filed: Mar. 27, 2012

(65) Prior Publication Data

US 2012/0183864 A1 Jul. 19, 2012

Related U.S. Application Data

(62) Division of application No. 10/564,852, filed as application No. PCT/JP2004/010194 on Jul. 16, 2004, now Pat. No. 8,163,427.

(30) Foreign Application Priority Data

Jul. 17, 2003 (JP) ................................. 2003-198421
Nov. 13, 2003 (JP) ................................. 2003-383403

(51) Int. Cl.
  *H01M 6/16* (2006.01)
(52) U.S. Cl.
  USPC ........... 429/330; 429/331; 429/332; 429/341; 429/340; 429/324; 429/326; 429/327; 429/336; 429/200; 252/62.2
(58) Field of Classification Search
  USPC ......... 429/330, 331, 332, 341, 340, 324, 326, 429/327, 336, 200; 252/62.2
  See application file for complete search history.

(56) References Cited

U.S. PATENT DOCUMENTS

| 6,866,966 B2 | 3/2005 | Hamamoto et al. |
| 6,927,001 B1 | 8/2005 | Hamamoto et al. |
| 8,163,427 B2 * | 4/2012 | Abe et al. ...................... 429/330 |
| 2002/0122988 A1 | 9/2002 | Hamamoto et al. |
| 2003/0118912 A1 | 6/2003 | Watanabe et al. |

FOREIGN PATENT DOCUMENTS

| EP | 1 199 766 A2 | 4/2002 |
| EP | 1 199 766 A3 | 6/2004 |
| JP | 2000-195545 | 7/2000 |
| JP | 2001-043895 | 2/2001 |
| JP | 2002-117895 | 4/2002 |
| JP | 2002-124297 | 4/2002 |
| JP | 2002-313415 | 10/2002 |
| JP | 2002-343426 | 11/2002 |
| JP | 2003-059529 * | 2/2003 |
| JP | 2003-142075 | 5/2003 |
| JP | 2003-187868 | 7/2003 |
| JP | 2004-265848 | 9/2004 |

OTHER PUBLICATIONS

Supplemental Partial European Search Report mailed Oct. 27, 2008 Application No. EP 04 74 7660.
International Preliminary Report on Patentability, PCT/JP2004/010194, May 11, 2006.
International Search Report, PCT/JP2004/010194, Nov. 22, 2004.

* cited by examiner

*Primary Examiner* — Laura Weiner
(74) *Attorney, Agent, or Firm* — Nixon Peabody LLP; Jeffrey L. Costellia

(57) ABSTRACT

A non-aqueous electrolytic solution is advantageously used in preparation of a lithium secondary battery excellent in cycle characteristics. In the non-aqueous electrolytic solution for a lithium secondary battery, an electrolyte salt is dissolved in a non-aqueous solvent. The non-aqueous electrolytic solution further contains a vinylene carbonate compound in an amount of 0.01 to 10 wt. %, and an alkyne compound in an amount of 0.01 to 10 wt. %.

4 Claims, No Drawings

NON-AQUEOUS ELECTROLYTIC SOLUTION FOR LITHIUM SECONDARY BATTERY AND LITHIUM SECONDARY BATTERY USING THE SAME

CROSS REFERENCE TO RELATED APPLICATIONS

This application is a divisional of application Ser. No. 10/564,852 filed on Jan. 17, 2006 which is now U.S. Pat. No. 8,163,427 which is a 35 U.S.C. 371 National Stage Application of International Application No. PCT/JP2004/10194 filed on Jul. 16, 2004, the contents of both of which are incorporated herein by reference in their entirety.

FIELD OF THE INVENTION

The present invention relates to a lithium secondary battery showing excellent cycle characteristics, and a non-aqueous electrolytic solution advantageously used in preparation of the lithium secondary battery excellent in cycle characteristics.

BACKGROUND OF THE INVENTION

The lithium secondary battery has recently been widely used for example, as an electric source for driving small-sized electronics. The lithium secondary battery has a basic structure comprising a positive electriode, a negative electrode and a non-aqueous electrolytic solution, which are contained in a sealed cell. The positive electrode preferably comprises a complex oxide of lithium such as $LiCoO_2$, and the negative electrode preferably comprises a carbon material or metallic lithium. A carbonate such as ethylene carbonate (EC) or propylene carbonate (PC) has been advantageously used in the non-aqueous electrolytic solution for the lithium secondary battery.

The recent lithium secondary battery requires a further improvement on battery performance such as cycle characteristics of the battery and electric capacity.

In a lithium secondary battery, a complex oxide of lithium such as $LiCoO_2$, $LiMn_2O_4$ and $LiNiO_2$ is often used as a positive electrode material. A process of recharging the battery causes a local oxidation and decomposition reaction of a part of a solvent contained in a non-aqueous electrolytic solution. A decomposition product inhibits an ordinary electrochemical reaction of the battery to lower battery performance. The reason is considered that a solvent is electrochemically oxidized along an interface between the positive electrode material and the non-aqueous electrolytic solution.

In a lithium secondary battery, a highly crystallized carbon material such as natural or artificial graphite is often used as a negative electrode material. A process of recharging the battery causes a local reduction and decomposition reaction of a part of a solvent contained in a non-aqueous electrolytic solution. Ethylene carbonate (EC) is widely used as a solvent of the non-aqueous electrolytic solvent. Ethylene carbonate may particularly be reduced and decomposed to lower battery performance while repeating charge and discharge.

Japanese Patent Provisional Publication No. 8 (1996)-45545 and U.S. Pat. No. 5,626,981 recommend adding a vinylene carbonate compound to a non-aqueous electrolytic solution to improve battery performance of the lithium secondary battery. It is further reported that the cycle life is lengthened using the electric solution containing the vinylene carbonate compound.

Japanese Patent Provisional Publication Nos. 2000-195545, 2001-313072, 2002-100399 and 2002-124297 and U.S. Pat. No. 6,479,191 B1 recommend adding an alkyne compound to a non-aqueous electrolytic solution to improve battery performance of the lithium secondary battery. It is further reported that the cycle life is lengthened using the electric solution containing the alkyne compound.

Increase in density of a positive electrode composition layer or a negative electrode composition layer has recently been examined to enlarge capacity of the lithium secondary battery. Japanese Patent Provisional Publication No. 2003-142075 describes a lithium secondary battery comprising a positive electrode composition layer having a density of 3.3 to 3.7 $g/cm^3$ provided on aluminum foil, and a negative electrode composition layer having a density of 1.4 to 1.8 $g/cm^3$ provided on copper foil. It is further reported that the obtained lithium secondary battery has high energy density and high safety, and can be preserved at an elevated temperature.

DISCLOSURE OF THE INVENTION

Problems to be Solved by the Invention

As is described in the above-mentioned documents, battery performance such as cycle characteristics can be improved by adding a vinylene carbonate compound or an alkyne compound to a non-aqueous electrolytic solution of a lithium secondary battery.

The conventional lithium secondary battery comprises positive electrode and negative electrode composition layers of relatively low density. The battery performance such as the cycle characteristics can be improved by adding a vinylene carbonate compound or an alkyne cornpound to a non-aqueous electrolytic solution of the conventional lithium secondary battery.

On the other hand, the recent lithium secondary battery comprises positive electrode and negative electrode composition layers of high density. The present inventors have found that cycle characteristics are scarcely improved by adding the above-mentioned additive to the non-aqueous electrolytic solution of the recent lithium secondary battery. The inventors have further found that the electrolytic solution is decomposed in the battery to cause shortage (dry up) of the electrolytic solution. The cycle characteristics mean a feature of keeping a high charge capacity after repeating charge and discharge operations many times.

An object of the present invention is to provide a non-aqueous electrolytic solution that has solved the above-mentioned problems of the non-aqueous electrolytic solution for the lithium secondary battery.

Means to Solve the Problem

The present invention provides a non-aqueous electrolytic solution for a lithium secondary battery in which an electrolyte salt is dissolved in a non-aqueous solvent, wherein the non-aqueous electrolytic solution further contains a vinylene carbonate compound represented by the formula (I) in an amount of 0.01 to 10 wt. %, and an alkyne compound represented by the formula (II), (III), (IV), (V), (VI) or (VII) in an amount of 0.01 to 10 wt. %:

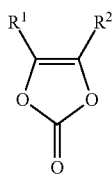
(I)

(in which each of $R^1$ and $R^2$ independently is a hydrogen atom or an alkyl group having 1 to 4 carbon atoms)

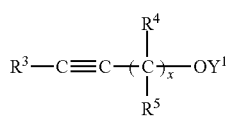
(II)

(in which each of $R^3$ to $R^5$ independently is a hydrogen atom, an alkyl group having 1 to 12 carbon atoms, a cycloalkyl group having 3 to 6 carbon atoms or an aryl group having 6 to 12 carbon atoms, or $R^4$ and $R^5$ are combined with each other to form a cycloalkylene group having 3 to 6 carbon atoms; x is 1 or 2; and $Y^1$ is —COOR$^{20}$, —COR$^{20}$ or —SO$_2$R$^{20}$, wherein $R^{20}$ is a hydrogen atom, an alkyl group having 1 to 12 carbon atoms, a cycloalkyl group having 3 to 6 carbon atoms or an aryl group having 6 to 12 carbon atoms)

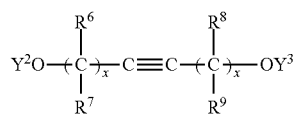
(III)

(in which each of $R^6$ to $R^9$ independently is a hydrogen atom, an alkyl group having 1 to 12 carbon atoms, a cycloalkyl group having 3 to 6 carbon atoms or an aryl group having 6 to 12 carbon atoms, or $R^6$ and $R^7$ or $R^8$ and $R^9$ are combined with each other to form a cycloalkylene group having 3 to 6 carbon atoms; x is 1 or 2; $Y^2$ is —COOR$^{21}$, —COR$^{21}$ or —SO$_2$R$^{21}$, wherein $R^{21}$ is a hydrogen atom, an alkyl group having 1 to 12 carbon atoms, a cycloalkyl group having 3 to 6 carbon atoms or an aryl group having 6 to 12 carbon atoms; and $Y^3$ is —COOR$^{22}$, —COR$^{22}$ or —SO$_2$R$^{22}$, wherein $R^{22}$ is a hydrogen atom, an alkyl group having 1 to 12 carbon atoms, a cycloalkyl group having 3 to 6 carbon atoms or an aryl group having 6 to 12 carbon atoms)

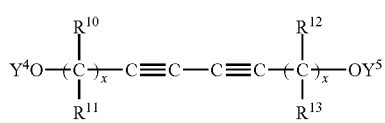
(IV)

(in which each of $R^{10}$ to $R^{13}$ independently is a hydrogen atom, an alkyl group having 1 to 12 carbon atoms, a cycloalkyl group having 3 to 6 carbon atoms or an aryl group having 6 to 12 carbon atoms, or $R^{10}$ and $R^{11}$ or $R^{12}$ and $R^{13}$ are combined with each other to form a cycloalkylene group having 3 to 6 carbon atoms; x is 1 or 2; $Y^4$ is —COOR$^{23}$, —COR$^{23}$ or —SO$_2$R$^{23}$, wherein $R^{23}$ is a hydrogen atom, an alkyl group having 1 to 12 carbon atoms, a cycloalkyl group having 3 to 6 carbon atoms or an aryl group having 6 to 12 carbon atoms; and $Y^5$ is —COOR$^{24}$, —COR$^{24}$ or —SO$_2$R$^{24}$, wherein $R^{24}$ is a hydrogen atom, an alkyl group having 1 to 12 carbon atoms, a cycloalkyl group having 3 to 6 carbon atoms or an aryl group having 6 to 12 carbon atoms)

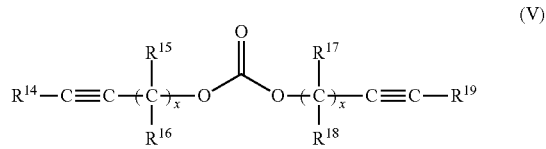
(V)

(in which each of $R^{14}$ to $R^{19}$ independently is a hydrogen atom, an alkyl group having 1 to 12 carbon atoms, a cycloalkyl group having 3 to 6 carbon atoms or an aryl group having 6 to 12 carbon atoms, or $R^{15}$ and $R^{16}$ or $R^{17}$ and $R^{18}$ are combined with each other to form a cycloalkylene group having 3 to 6 carbon atoms; and x is 1 or 2)

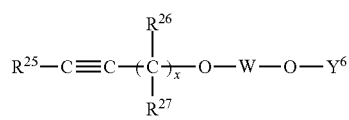
(VI)

(in which each of $R^{25}$ to $R^{27}$ independently is a hydrogen atom, an alkyl group having 1 to 12 carbon atoms, a cycloalkyl group having 3 to 6 carbon atoms, an aryl group having 6 to 12 carbon atoms or an aralkyl group having 7 to 12 carbon atoms, or $R^{26}$ and $R^{27}$ are combined with each other to form a cycloalkylene group having 3 to 6 carbon atoms; x is 1 or 2; W is sulfinyl, sulfonyl or oxalyl; and $Y^6$ is an alkyl group having 1 to 12 carbon atoms, an alkenyl group having 2 to 12 carbon atoms, an alkynyl group having 2 to 12 carbon atoms, a cycloalkyl group having 3 to 6 carbon atoms, an aryl group having 6 to 12 carbon atoms or an aralkyl group having 7 to 12 carbon atoms)

(VII)

(in which $R^{28}$ is an alkyl group having 1 to 12 carbon atoms, a cycloalkyl group having 3 to 6 carbon atoms, or an aryl group having 6 to 12 carbon atoms; $R^{29}$ is a hydrogen atom, an alkyl group having 1 to 12 carbon atoms, a cycloalkyl group having 3 to 6 carbon atoms, or an aryl group having 6 to 12 carbon atoms; and p is 1 or 2).

The non-aqueous electrolytic solution according to the present invention contains both a specific amount of a vinylene carbonate compound and a specific amount of an alkyne compound. The non-aqueous electrolytic solution can be advantageously used in a lithium secondary battery of high capacity comprising a positive electrode and negative electrode composition layers of high density. The lithium secondary battery comprising the non-aqueous electrolytic solution according to the present invention is improved in cycle characteristics without causing phenomenon of dry up. The function and effect have not yet clarified, but are considered to be obtained by a strong film formed on a negative electrode using both the vinylene carbonate compound and the alkyne compound. The improvement on the cycle characteristics is obtained using the non-aqueous electrolytic solution according to the present invention. The improvement is also effective in a conventional lithium secondary battery comprising positive electrode and negative electrode layers of relatively low density.

Effect of the Invention

The cycle characteristics of the lithium secondary battery are improved by using the non-aqueous electrolytic solution according to the present invention. The non-aqueous electrolytic solution according to the present invention is particularly effective in improving cycle characteristics of a lithium secondary battery (of high charge capacity) comprising positive electrode or negative electrode composition layer of high density.

BEST MODE FOR CARRYING OUT THE INVENTION

In the vinylene carbonate compound according to the present invention represented by the formula (I), each of $R^1$ and $R^2$ independently is a hydrogen atom or an alkyl group having 1 to 4 carbon atoms, such as methyl, ethyl, propyl and butyl. $R^1$ and $R^2$ can be identical, for example, both can be methyl or both can be ethyl. $R^1$ and $R^2$ can be different from each other, for example, they can be a combination of methyl and ethyl.

Examples of the vinylene carbonate compound represented by the formula (I) include vinylene carbonate, 4-methyl-1,3-dioxolen-2-one, 4-ethyl-1,3-dioxolen-2-one, 4-propyl-1,3-dioxolen-2-one, 4-butyl-1,3-dioxolen-2-one, 4-tert-butyl-1,3-dioxolen-2-one, 4,5-dimethyl-1,3-dioxolen-2-one, 4,5-diethyl-1,3-dioxolen-2-one, 4,5-dipropyl-1,3-dioxolen-2-one, 4,5-dibutyl-1,3-dioxolen-2-one, 4,5-ditert-butyl-1,3-dioxolen-2-one, 4-ethyl-5-methyl-1,3-dioxolen-2-one, 4-methyl-5-butyl-1,3-dioxolen-2-one and 4-methyl-5-tert-butyl-1,3-dioxolen-2-one. Vinylene carbonate is particularly preferred.

An excess amount of the vinylene carbonate compound represented by the formula (I) contained in the non-aqueous electrolytic solution might lower battery performance. On the other hand, shortage of the vinylene carbonate might cause insufficient battery performance. The non-aqueous electrolytic solution contains the vinylene carbonate compound preferably in an amount of 0.01 wt. % or more, more preferably in an amount of 0.05 wt. % or more, and most preferably in an amount of 0.1 wt. % or more. Further, the non-aqueous electrolytic solution contains the vinylene carbonate compound preferably in an amount of 10 wt. % or less, more preferably in an amount of 5 wt. % or less, and most preferably in an amount of 3 wt. % or less. Accordingly, the non-aqueous electrolytic solution contains the vinylene carbonate compound preferably in an amount of 0.01 to 10 wt. %, more preferably in an amount of 0.05 to 5 wt. %, and most preferably in an amount of 0.1 to 3 wt. %.

An alkyne compound is used in combination with the vinylene carbonate compound in the present invention. The alkyne compound is described below.

Examples of the alkyne compound represented by the formula (II) are shown below.

(1) $Y^1$ is —COOR$^{20}$

2-Propynyl methyl carbonate (each of $R^3$, $R^4$ and $R^5$ is hydrogen, $R^{20}$ is methyl, and x is 1)

1-Methyl-2-propynyl methyl carbonate ($R^3$ is hydrogen, $R^4$ is methyl, $R^5$ is hydrogen, $R^{20}$ is methyl, and x is 1)

2-Propynyl ethyl carbonate (each of $R^3$, $R^4$ and $R^5$ is hydrogen, $R^{20}$ is ethyl, and x is 1)

2-Propynyl propyl carbonate (each of $R^3$, $R^4$ and $R^5$ is hydrogen, $R^{20}$ is propyl, and x is 1)

2-Propynyl butyl carbonate (each of $R^3$, $R^4$ and $R^5$ is hydrogen, $R^{20}$ is butyl, and x is 1)

2-Propynyl phenyl carbonate (each of $R^3$, $R^4$ and $R^5$ is hydrogen, $R^{20}$ is phenyl, and x is 1)

2-Propynyl cyclohexyl carbonate (each of $R^3$, $R^4$ and $R^5$ is hydrogen, $R^{20}$ is cyclohexyl, and x is 1)

2-Butynyl methyl carbonate ($R^3$ is methyl, each of $R^4$ and $R^5$ is hydrogen, $R^{20}$ is methyl, and x is 1)

3-Butynyl methyl carbonate (each of $R^3$, $R^4$ and $R^5$ is hydrogen, $R^{20}$ is methyl, and x is 2)

2-Pentynyl methyl carbonate ($R^3$ is ethyl, each of $R^4$ and $R^5$ is hydrogen, $R^{20}$ is methyl, and x is 1)

1-Methyl-2-butynyl methyl carbonate (each of $R^3$ and $R^4$ is methyl, $R^5$ is hydrogen, $R^{20}$ is methyl, and x is 1)

1,1-Dimethyl-2-propynyl methyl carbonate ($R^3$ is hydrogen, each of $R^4$ and $R^5$ is methyl, $R^{20}$ is methyl, and x is 1)

1,1-Diethyl-2-propynyl methyl carbonate ($R^3$ is hydrogen, each of $R^4$ and $R^5$ is ethyl, $R^{20}$ is methyl, and x is 1)

1-Ethyl-1-methyl-2-propynyl methyl carbonate ($R^3$ is hydrogen, $R^4$ is ethyl, $R^5$ is methyl, $R^{20}$ is methyl, and x is 1)

1-Isobutyl-1-methyl-2-propynyl methyl carbonate ($R^3$ is hydrogen, $R^4$ is isobutyl, $R^5$ is methyl, $R^{20}$ is methyl, and x is 1)

1,1-Dimethyl-2-butynyl methyl carbonate (each of $R^3$, $R^4$ and $R^5$ is methyl, $R^{20}$ is methyl, and x is 1)

1-Ethynylcyclohexyl methyl carbonate ($R^3$ is hydrogen, combination of $R^4$ and $R^5$ is pentamethylene, $R^{20}$ is methyl, and x is 1)

1-Methyl-1-phenyl-2-propynyl methyl carbonate ($R^3$ is hydrogen, $R^4$ is phenyl, $R^5$ is methyl, $R^{20}$ is methyl, and x is 1)

1,1-Diphenyl-2-propynyl methyl carbonate ($R^3$ is hydrogen, each of $R^4$ and $R^5$ is phenyl, $R^{20}$ is methyl, and x is 1)

1,1-Dimethyl-2-propynyl ethyl carbonate ($R^3$ is hydrogen, each of $R^4$ and $R^5$ is methyl, $R^{20}$ is ethyl, and x is 1)

(2) $Y^1$ is —COR$^{20}$

2-Propynyl formate (each of $R^3$, $R^4$, $R^5$ and $R^{20}$ is hydrogen, and x is 1)

1-Methyl-2-propynyl formate ($R^3$ is hydrogen, $R^4$ is methyl, $R^5$ is hydrogen, $R^{20}$ is hydrogen, and x is 1)

2-Propynyl acetate (each of $R^3$, $R^4$ and $R^5$ is hydrogen, $R^{20}$ is methyl, and x is 1)

1-Methyl-2-propynyl acetate ($R^3$ is hydrogen, $R^4$ is methyl, $R^5$ is hydrogen, $R^{20}$ is methyl, and x is 1)

2-Propynyl propionate (each of $R^3$, $R^4$ and $R^5$ is hydrogen, $R^{20}$ is ethyl, and x is 1)

2-Propynyl butyrate (each of $R^3$, $R^4$ and $R^5$ is hydrogen, $R^{20}$ is propyl, and x is 1)

2-Propynyl benzoate (each of $R^3$, $R^4$ and $R^5$ is hydrogen, $R^{20}$ is phenyl, and x is 1)

2-Propynyl cyclohexanecarboxylate (each of $R^3$, $R^4$ and $R^5$ is hydrogen, $R^{20}$ is cyclohexyl, and x is 1)

2-Butynyl formate ($R^3$ is methyl, each of $R^4$, $R^5$ and $R^{20}$ is hydrogen, and x is 1)

3-Butynyl formate (each of $R^3$, $R^4$, $R^5$ and $R^{20}$ is hydrogen, and x is 2)

2-Pentynyl formate ($R^3$ is ethyl, each of $R^4$, $R^5$ and $R^{20}$ is hydrogen, and x is 1)

1-Methyl-2-butynyl formate (each of $R^3$ and $R^4$ is methyl, each of $R^5$ and $R^{20}$ is hydrogen, and x is 1)

1,1-Dimethyl-2-propynyl formate ($R^3$ is hydrogen, each of $R^4$ and $R^5$ is methyl, $R^{20}$ is hydrogen, and x is 1)

1,1-Diethyl-2-propynyl formate ($R^3$ is hydrogen, each of $R^4$ and $R^5$ is ethyl, $R^{20}$ is hydrogen, and x is 1)

1-Ethyl-1-methyl-2-propynyl formate ($R^3$ is hydrogen, $R^4$ is ethyl, $R^5$ is methyl, $R^{20}$ is hydrogen, and x is 1)

1-Isobutyl-1-methyl-2-propynyl formate ($R^3$ is hydrogen, $R^4$ is isobutyl, $R^5$ is methyl, $R^{20}$ is hydrogen, and x is 1)

1,1-Dimethyl-2-butynyl formate (each of $R^3$, $R^4$ and $R^5$ is methyl, $R^{20}$ is hydrogen, and x is 1)

1-Ethynylcyclohexyl formate ($R^3$ is hydrogen, combination of $R^4$ and $R^5$ is pentamethylene, $R^{20}$ is hydrogen, and x is 1)

1-Methyl-1-phenyl-2-propynyl formate ($R^3$ is hydrogen, $R^4$ is phenyl, $R^5$ is methyl, $R^{20}$ is hydrogen, and x is 1)

1,1-Diphenyl-2-propynyl formate ($R^3$ is hydrogen, each of $R^4$ and $R^5$ is phenyl, $R^{20}$ is hydrogen, and x is 1)

2-Butynyl acetate ($R^3$ is methyl, each of $R^4$ and $R^5$ is hydrogen, $R^{20}$ is methyl, and x is 1)

3-Butynyl acetate (each of $R^3$, $R^4$ and $R^5$ is hydrogen, $R^{20}$ is methyl, and x is 2)

2-Pentynyl acetate ($R^3$ is ethyl, each of $R^4$ and $R^5$ is hydrogen, $R^{20}$ is methyl, and x is 1)

1-Methyl-2-butynyl acetate (each of $R^3$ and $R^4$ is methyl, $R^5$ is hydrogen, $R^{20}$ is methyl, and x is 1)

1,1-Dimethyl-2-propynyl acetate ($R^3$ is hydrogen, each of $R^4$ and $R^5$ is methyl, $R^{20}$ is methyl, and x is 1)

1,1-Diethyl-2-propynyl acetate ($R^3$ is hydrogen, each of $R^4$ and $R^5$ is ethyl, $R^{20}$ is methyl, and x is 1)

1-Ethyl-1-methyl-2-propynyl acetate ($R^3$ is hydrogen, $R^4$ is ethyl, $R^5$ is methyl, $R^{20}$ is methyl, and x is 1)

1-Isobutyl-1-methyl-2-propynyl acetate ($R^3$ is hydrogen, $R^4$ is isobutyl, $R^5$ is methyl, $R^{20}$ is methyl, and x is 1)

1,1-Dimethyl-2-butynyl acetate (each of $R^3$, $R^4$ and $R^5$ is methyl, $R^{20}$ is methyl, and x is 1)

1-Ethynylcyclohexyl acetate ($R^3$ is hydrogen, combination of $R^4$ and $R^5$ is pentamethylene, $R^{20}$ is methyl, and x is 1)

1-Methyl-1-phenyl-2-propynyl acetate ($R^3$ is hydrogen, $R^4$ is phenyl, $R^5$ is methyl, $R^{20}$ is methyl, and x is 1)

1,1-Diphenyl-2-propynyl acetate ($R^3$ is hydrogen, each of $R^4$ and $R^5$ is phenyl, $R^{20}$ is methyl, and x is 1)

1,1-Dimethyl-2-propynyl propionate ($R^3$ is hydrogen, each of $R^4$ and $R^5$ is methyl, $R^{20}$ is ethyl, and x is 1)

(3) $Y^1$ is —$SO_2R^{20}$

2-Propynyl methanesulfonate (each of $R^3$, $R^4$ and $R^5$ is hydrogen, $R^{20}$ is methyl, and x is 1)

1-Methyl-2-propynyl methanesulfonate ($R^3$ is hydrogen, $R^4$ is methyl, $R^5$ is hydrogen, $R^{20}$ is methyl, and x is 1)

2-Propynyl ethanesulfonate (each of $R^3$, $R^4$ and $R^5$ is hydrogen, $R^{20}$ is ethyl, and x is 1)

2-Propynyl propanesulfonate (each of $R^3$, $R^4$ and $R^5$ is hydrogen, $R^{20}$ is propyl, and x is 1)

2-Propynyl p-toluenesulfonate, (each of $R^3$, $R^4$ and $R^5$ is hydrogen, $R^{20}$ is p-tolyl, and x is 1)

2-Propynyl cyclohexanesulfonate (each of $R^3$, $R^4$ and $R^5$ is hydrogen, $R^{20}$ is cyclohexyl, and x is 1)

2-Butynyl methanesulfonate ($R^3$ is methyl, each of $R^4$ and $R^5$ is hydrogen, $R^{20}$ is methyl, and x is 1)

3-Butynyl methanesulfonate (each of $R^3$, $R^4$ and $R^5$ is hydrogen, $R^{20}$ is methyl, and x is 2)

2-Pentynyl methanesulfonate ($R^3$ is ethyl, each of $R^4$ and $R^5$ is hydrogen, $R^{20}$ is methyl, and x is 1)

1-Methyl-2-butynyl methanesulfonate (each of $R^3$ and $R^4$ is methyl, $R^5$ is hydrogen, $R^{20}$ is methyl, and x is 1)

1,1-Dimethyl-2-propynyl methanesulfonate ($R^3$ is hydrogen, each of $R^4$ and $R^5$ is methyl, $R^{20}$ is methyl, and x is 1)

1,1-Diethyl-2-propynyl methanesulfonate ($R^3$ is hydrogen, each of $R^4$ and $R^5$ is ethyl, $R^{20}$ is methyl, and x is 1)

1-Ethyl-1-methyl-2-propynyl methanesulfonate ($R^3$ is hydrogen, $R^4$ is ethyl, $R^5$ is methyl, $R^{20}$ is methyl, and x is 1)

1-Isobutyl-1-methyl-2-propynyl methanesulfonate ($R^3$ is hydrogen, $R^4$ is isobutyl, $R^5$ is methyl, $R^{20}$ is methyl, and x is 1)

1,1-Dimethyl-2-butynyl methanesulfonate (each of $R^3$, $R^4$ and $R^5$ is methyl, $R^{20}$ is methyl, and x is 1)

1-Ethynylcyclohexyl methanesulfonate ($R^3$ is hydrogen, combination of $R^4$ and $R^5$ is pentamethylene, $R^{20}$ is methyl, and x is 1)

1-Methyl-1-phenyl-2-propynyl methanesulfonate ($R^3$ is hydrogen, $R^4$ is phenyl, $R^5$ is methyl, $R^{20}$ is methyl, and x is 1)

1,1-Diphenyl-2-propynyl methanesulfonate ($R^3$ is hydrogen, each of $R^4$ and $R^5$ is phenyl, $R^{20}$ is methyl, and x is 1)

1,1-Dimethyl-2-propynyl ethanesulfonate ($R^3$ is hydrogen, each of $R^4$ and $R^5$ is methyl, $R^{20}$ is ethyl, and x is 1)

Examples of the alkyne compound represented by the formula (III) are shown below.

(1) $Y^2$ is —$COOR^{21}$ and $Y^3$ is —$COOR^{22}$

2-Butynylene bis(methyl carbonate) (each of $R^6$, $R^7$, $R^8$ and $R^9$ is hydrogen, each of $R^{21}$ and $R^{22}$ is methyl, and x is 1)

2-Butynylene bis(ethyl carbonate) (each of $R^6$, $R^7$, $R^8$ and $R^9$ is hydrogen, each of $R^{21}$ and $R^{22}$ is ethyl, and x is 1)

1,4-Dimethyl-2-butynylene bis(methyl carbonate) (each of $R^6$ and $R^8$ is methyl, each of $R^7$ and $R^9$ is hydrogen, each of $R^{21}$ and $R^{22}$ is methyl, and x is 1)

1,4-Dimethyl-2-butynylene bis(ethyl carbonate) (each of $R^6$ and $R^8$ is methyl, each of $R^7$ and $R^9$ is hydrogen, each of $R^{21}$ and $R^{22}$ is ethyl, and x is 1) 1,1,4,4-Tetramethyl-2-butynylene bis(methyl carbonate) (each of $R^6$, $R^7$, $R^8$ and $R^9$ is methyl, each of $R^{21}$ and $R^{22}$ is methyl, and x is 1)

1,1,4,4-Tetramethyl-2-butynylene bis(ethyl carbonate) (each of $R^6$, $R^7$, $R^8$ and $R^9$ is methyl, each of $R^{21}$ and $R^{22}$ is ethyl, and x is 1)

(2) $Y^2$ is —$COR^{21}$ and $Y^3$ is —$COR^{22}$

2-Butynylene diformate (each of $R^6$, $R^7$, $R^8$, $R^9$, $R^{21}$ and $R^{22}$ is hydrogen, and x is 1)

2-Butynylene diacetate (each of $R^6$, $R^7$, $R^8$ and $R^9$ is hydrogen, each of $R^{21}$ and $R^{22}$ is methyl, and x is 1)

2-Butynylene dipropionate (each of $R^6$, $R^7$, $R^8$ and $R^9$ is hydrogen, each of $R^{21}$ and $R^{22}$ is ethyl, and x is 1)

1,4-Dimethyl-2-butynylene diformate (each of $R^6$ and $R^8$ is methyl, each of $R^7$, $R^9$, $R^{21}$ and $R^{22}$ is hydrogen, and x is 1)

1,4-Dimethyl-2-butynylene diacetate (each of $R^6$ and $R^8$ is methyl, each of $R^7$ and $R^9$ is hydrogen, each of $R^{21}$ and $R^{22}$ is methyl, and x is 1)

1,4-Dimethyl-2-butynylene dipropionate (each of $R^6$ and $R^8$ is methyl, each of $R^7$ and $R^9$ is hydrogen, each of $R^{21}$ and $R^{22}$ is ethyl, and x is 1) 1,1,4,4-Tetramethyl-2-butynylene diformate (each of $R^6$, $R^7$, $R^8$ and $R^9$ is methyl, each of $R^{21}$ and $R^{22}$ is hydrogen, and x is 1) 1,1,4,4-Tetramethyl-2-butynylene diacetate (each of $R^6$, $R^7$, $R^8$ and $R^9$ is methyl, each of $R^{21}$ and $R^{22}$ is methyl, and x is 1)

1,1,4,4-Tetramethyl-2-butynylene dipropionate (each of $R^6$, $R^7$, $R^8$ and $R^9$ is methyl, each of $R^{21}$ and $R^{22}$ is ethyl, and x is 1)

(3) $Y^2$ is —$SO_2R^{21}$ and $Y^3$ is —$SO_2R^{22}$

2-Butynylene bis(methanesulfonate) (each of $R^6$, $R^7$, $R^8$ and $R^9$ is hydrogen, each of $R^{21}$ and $R^{22}$ is methyl, and x is 1)

2-Butynylene bis(ethanesulfonate) (each of $R^6$, $R^7$, $R^8$ and $R^9$ is hydrogen, each of $R^{21}$ and $R^{22}$ is ethyl, and x is 1,4-Dimethyl-2-butynylene bis(methanesulfonate) (each of $R^6$ and $R^8$ is methyl, each of $R^7$ and $R^9$ is hydrogen, each of $R^{21}$ and $R^{22}$ is methyl, and x is 1)

1,4-Dimethyl-2-butynylene bis(ethanesulfonate) (each of $R^6$ and $R^8$ is methyl, each of $R^7$ and $R^9$ is hydrogen, each of $R^{21}$ and $R^{22}$ is ethyl, and x is 1) 1,1,4,4-Tetramethyl-2-butynylene bis(methanesulfonate) (each of $R^6$, $R^7$, $R^8$ and $R^9$ is methyl, each of $R^{21}$ and $R^{22}$ is methyl, and x is 1)

1,1,4,4-Tetramethyl-2-butynylene bis(ethanesulfonate) (each of $R^6$, $R^7$, $R^8$ and $R^9$ is methyl, each of $R^{21}$ and $R^{22}$ is ethyl, and x is 1)

Examples of the alkyne compound represented by the formula (IV) are shown below.

(1) $Y^4$ is —$COOR^{23}$ and $Y^5$ is —$COOR^{24}$ 2,4-Hexadiynylene bis(methyl carbonate) (each of $R^{10}$, $R^{11}$, $R^{12}$ and $R^{13}$ is hydrogen, each of $R^{23}$ and $R^{24}$ is methyl, and x is 1)

2,4-Hexadiynylene bis(ethyl carbonate) (each of $R^{10}$, $R^{12}$ and $R^{13}$ is hydrogen, each of $R^{23}$ and $R^{24}$ is ethyl, and x is 1)

1,1,6,6-Tetramethyl-2,4-hexadiynylene bis(methyl carbonate) (each of $R^{10}$, $R^{11}$, $R^{12}$ and $R^{13}$ is methyl, each of $R^{23}$ and $R^{24}$ is methyl, and x is 1) 1,1,6,6-Tetramethyl-2,4-hexadiynylene bis(ethyl carbonate) (each of $R^{10}$, $R^{11}$, $R^{12}$ and $R^{13}$ is methyl, each of $R^{23}$ and $R^{24}$ is ethyl, and x is 1) 30

(2) $Y^4$ is —$COR^{23}$ and $Y^5$ is —$COR^{24}$ 2,4-Hexadiynylene diformate (each of $R^{10}$, $R^{11}$, $R^{12}$, $R^{13}$, $R^{23}$ and $R^{24}$ is hydrogen, and x is 1)

2,4-Hexadiynylene diacetate (each of $R^{10}$, $R^{11}$, $R^{12}$ and $R^{13}$ is hydrogen, each of $R^{23}$ and $R^{24}$ is methyl, and x is 1)

2,4-Hexadiynylene dipropionate (each of $R^{10}$, $R^{11}$, $R^{12}$ and $R^{13}$ is hydrogen, each of $R^{23}$ and $R^{24}$ is ethyl, and x is 1)

1,1,6,6-Tetramethyl-2,4-hexadiynylene diformate (each of $R^{10}$, $R^{11}$, $R^{12}$ and $R^{13}$ is methyl, each of $R^{23}$ and $R^{24}$ is hydrogen, and x is 1)

1,1,6,6-Tetramethyl-2,4-hexadiynylene diacetate (each of $R^{10}$, $R^{11}$, $R^{12}$ and $R^{13}$ is methyl, each of $R^{23}$ and $R^{24}$ is methyl, and x is 1)

1,1,6,6-Tetramethyl-2,4-hexadiynylene dipropionate (each of $R^{10}$, $R^{11}$, $R^{12}$ and $R^{13}$ is methyl, each of $R^{23}$ and $R^{24}$ is ethyl, and x is 1)

(3) $Y^4$ is —$SO_2R^{23}$ and $Y^5$ is —$SO_2R^{24}$ 2,4-Hexadiynylene bis(methanesulfonate) (each of $R^{10}$, $R^{11}$, $R^{12}$ and $R^{13}$ is hydrogen, each of $R^{23}$ and $R^{24}$ is methyl, and x is 1)

2,4-Hexadiynylene bis(ethanesulfonate) (each of $R^{10}$, $R^{11}$, $R^{12}$ and $R^{13}$ is hydrogen, each of $R^{23}$ and $R^{24}$ is ethyl, and x is 1)

1,1,6,6-Tetramethyl-2,4-hexadiynylene bis(methanesulfonate) (each of $R^{10}$, $R^{11}$, $R^{12}$ and $R^{13}$ is methyl, each of $R^{23}$ and $R^{24}$ is methyl, and x is 1)

1,1,6,6-Tetramethyl-2,4-hexadiynylene bis(ethanesulfonate) (each of $R^{10}$, $R^{11}$, $R^{12}$ and $R^{13}$ is methyl, each of $R^{23}$ and $R^{24}$ is ethyl, and x is 1)

Examples of the alkyne compound represented by the formula (V) are shown below.

Di(2-propynyl) carbonate (each of $R^{14}$, $R^{15}$, $R^{16}$, $R^{17}$, $R^{18}$ and $R^{19}$ is hydrogen, and x is 1)

Bis(1-methyl-2-propynyl) carbonate (each of $R^{14}$, $R^{16}$, $R^{18}$ and $R^{19}$ is hydrogen, each of $R^{15}$ and $R^{17}$ is methyl, and x is 1)

Di(2-butynyl) carbonate (each of $R^{14}$ and $R^{19}$ is methyl, each of $R^{15}$, $R^{16}$, $R^{17}$ and $R^{18}$ is hydrogen, and x is 1)

Di(3-butynyl) carbonate (each of $R^{14}$, $R^{15}$, $R^{16}$, $R^{17}$, $R^{18}$ and $R^{19}$ is hydrogen, and x is 2)

Di(2-pentynyl) carbonate (each of $R^{14}$ and $R^{19}$ is ethyl, each of $R^{15}$, $R^{16}$, $R^{17}$ and $R^{18}$ is hydrogen, and x is 1)

Bis(1-methyl-2-butynyl) carbonate (each of $R^{14}$, $R^{15}$, $R^{16}$ and $R^{19}$ is methyl, each of $R^{17}$ and $R^{18}$ is hydrogen, and x is 1)

2-Propynyl 2-butynyl carbonate (each of $R^{14}$, $R^{15}$, $R^{16}$, $R^{17}$ and $R^{18}$ is hydrogen, $R^{19}$ is methyl, and x is 1)

Bis(1,1-dimethyl-2-propynyl) carbonate (each of $R^{14}$ and $R^{19}$ is hydrogen, each of $R^{15}$, $R^{16}$, $R^{17}$ and $R^{18}$ is methyl, and x is 1) Bis(1,1-diethyl-2-propynyl) carbonate (each of $R^{14}$ and $R^{19}$ is hydrogen, each of $R^{15}$, $R^{16}$, $R^{17}$ and $R^{18}$ is ethyl, and x is 1)

Bis(1-ethyl-1-methyl-2-propynyl) carbonate (each of $R^{14}$ and $R^{19}$ is hydrogen, each of $R^{15}$ and $R^{17}$ is ethyl, each of $R^{16}$ and $R^{18}$ is methyl, and x is 1)

Bis(1-isobutyl-1-methyl-2-propynyl) carbonate (each of $R^{14}$ and $R^{19}$ is hydrogen, each of $R^{15}$ and $R^{17}$ is isobutyl, each of $R^{16}$ and $R^{18}$ is methyl, and x is 1)

Bis(1,1-dimethyl-2-butynyl) carbonate (each of $R^{14}$, $R^{15}$, $R^{16}$, $R^{17}$, $R^{18}$ and $R^{19}$ is methyl, and x is 1)

Bis(1-ethynylcyclohexyl) carbonate (each of $R^{14}$ and $R^{19}$ is hydrogen, combination of $R^{15}$ and $R^{16}$ is pentamethylene, combination of $R^{17}$ and $R^{18}$ is pentamethylene, and x is 1).

Examples of the alkyne compound represented by the formula (VI) are shown below.

(1) W is sulfinyl

Di(2-propynyl)sulfite (each of $R^{25}$, $R^{26}$ and $R^{27}$ is hydrogen, $Y^6$ is 2-propynyl, and x is 1)

Bis(1-methyl-2-propynyl)sulfite ($R^{25}$ is hydrogen, $R^{26}$ is methyl, $R^{27}$ is hydrogen, $Y^6$ is 1-methyl-2-propynyl, and x is 1)

Di(2-butynyl)sulfite ($R^{25}$ is methyl, each of $R^{26}$ and $R^{27}$ is hydrogen, $Y^6$ is 2-butynyl, and x is 1)

Di(3-butynyl)sulfite (each of $R^{25}$, $R^{26}$ and $R^{27}$ is hydrogen, $Y^6$ is 3-butynyl, and x is 2)

Di(2-pentynyl)sulfite ($R^{25}$ is ethyl, each of $R^{26}$ and $R^{27}$ is hydrogen, $Y^6$ is 2-pentynyl, and x is 1)

Bis(1-methyl-2-butynyl)sulfite (each of $R^{25}$ and $R^{26}$ is methyl, $R^{27}$ is hydrogen, $Y^6$ is 1-methyl-2-butynyl, and x is 1)

Bis(1,1-dimethyl-2-propynyl)sulfite ($R^{25}$ is hydrogen, each of $R^{26}$ and $R^{27}$ is methyl, $Y^6$ is 1,1-dimethyl-2-propynyl, and x is 1)

Bis(1,1-diethyl-2-propynyl)sulfite ($R^{25}$ is hydrogen, each of $R^{26}$ and $R^{27}$ is ethyl, $Y^6$ is 1,1-diethyl-2-propynyl, and x is 1)

Bis(1-ethyl-1-methyl-2-propynyl)sulfite ($R^{25}$ is hydrogen, $R^{26}$ is ethyl, $R^{27}$ is methyl, $Y^6$ is 1-ethyl-1-methyl-2-propynyl, and x is 1)

Bis(1-isobutyl-1-methyl-2-propynyl)sulfite ($R^{25}$ is hydrogen, $R^{26}$ is isobutyl, $R^{27}$ is methyl, $Y^6$ is 1-isobutyl-1-methyl-2-propynyl, and x is 1)

Bis(1,1-dimethyl-2-butynyl)sulfite (each of $R^{25}$, $R^{26}$ and $R^{27}$ is methyl, $Y^6$ is 1,1-dimethyl-2-butynyl, and x is 1)

Bis(1-ethynylcyclohexyl) sulfite ($R^{25}$ is hydrogen, combination of $R^{26}$ and $R^{27}$ is pentamethylene, $Y^6$ is 1-ethynylcyclohexyl, and x is 1)

Bis(1-methyl-1-phenyl-2-propynyl)sulfite ($R^{25}$ is hydrogen, $R^{26}$ is phenyl, $R^{27}$ is methyl, $Y^6$ is 1-methyl-1-phenyl-2-propynyl, and x is 1)

Bis(1,1-diphenyl-2-propynyl)sulfite ($R^{25}$ is hydrogen, each of $R^{26}$ and $R^{27}$ is phenyl, $Y^6$ is 1,1-diphenyl-2-propynyl, and x is 1)

Methyl 2-propynyl sulfite (each of $R^{25}$, $R^{26}$ and $R^{27}$ is hydrogen, $Y^6$ is methyl, and x is 1)

Methyl 1-methyl-2-propynyl sulfite ($R^{25}$ is hydrogen, $R^{26}$ is methyl, $R^{27}$ is hydrogen, $Y^6$ is methyl, and x is 1)

Ethyl 2-propynyl sulfite (each of $R^{25}$, $R^{26}$ and $R^{27}$ is hydrogen, $Y^6$ is ethyl, and x is 1)

Phenyl 2-propynyl sulfite (each of $R^{25}$, $R^{26}$ and $R^{27}$ is hydrogen, $Y^6$ is phenyl, and x is 1)

Cyclohexyl 2-propynyl sulfite (each of $R^{25}$, $R^{26}$ and $R^{27}$ is hydrogen, $Y^6$ is cyclohexyl, and x is 1)

(2) W is sulfonyl

Di(2-propynyl)sulfate (each of $R^{25}$, $R^{26}$ and $R^{27}$ is hydrogen $Y^6$ is 2-propynyl, and x is 1)

Bis(1-methyl-2-propynyl)sulfate ($R^{25}$ is hydrogen, $R^{26}$ is methyl, $R^{27}$ is hydrogen, $Y^6$ is 1-methyl-2-propynyl, and x is 1)

Di(2-butynyl)sulfate ($R^{25}$ is methyl, each of $R^{26}$ and $R^{27}$ is hydrogen, $Y^6$ is 2-butynyl, and x is 1)

Di(3-butynyl)sulfate (each of $R^{25}$, $R^{26}$ and $R^{27}$ is hydrogen, $Y^6$ is 3-butynyl, and x is 2)

Di(2-pentynyl)sulfate ($R^{25}$ is ethyl, each of $R^{26}$ and $R^{27}$ is hydrogen, $Y^6$ is 2-pentynyl, and x is 1)

Bis(1-methyl-2-butynyl)sulfate (each of $R^{25}$ and $R^{26}$ is methyl, $R^{27}$ is hydrogen, $Y^6$ is 1-methyl-2-butynyl, and x is 1)

Bis(1,1-dimethyl-2-propynyl)sulfate ($R^{25}$ is hydrogen, each of $R^{26}$ and $R^{27}$ is methyl, $Y^6$ is 1,1-dimethyl-2-propynyl, and x is 1)

Bis(1,1-diethyl-2-propynyl)sulfate ($R^{25}$ is hydrogen, each of $R^{26}$ and $R^{27}$ is ethyl, $Y^6$ is 1,1-diethyl-2-propynyl, and x is 1)

Bis(1-ethyl-1-methyl-2-propynyl)sulfate ($R^{25}$ is hydrogen, $R^{26}$ is ethyl, $R^{27}$ is methyl, $Y^6$ is 1-ethyl-1-methyl-2-propynyl, and x is 1)

Bis(1-isobutyl-1-methyl-2-propynyl)sulfate ($R^{25}$ is hydrogen, $R^{26}$ is isobutyl, $R^{27}$ is methyl, $Y^6$ is 1-isobutyl-1-methyl-2-propynyl, and x is 1)

Bis(1,1-dimethyl-2-butynyl)sulfate (each of $R^{25}$, $R^{26}$ and $R^{27}$ is methyl, $Y^6$ is 1,1-dimethyl-2-butynyl, and x is 1)

Bis(1-ethynylcyclohexyl) sulfate ($R^{25}$ is hydrogen, combination of $R^{26}$ and $R^{27}$ is pentamethylene, $Y^6$ is 1-ethynylcyclohexyl, and x is 1)

Bis(1-methyl-1-phenyl-2-propynyl)sulfate ($R^{25}$ is hydrogen, $R^{26}$ is phenyl, $R^{27}$ is methyl, $Y^6$ is 1-methyl-1-phenyl-2-propynyl, and x is 1)

Bis(1,1-diphenyl-2-propynyl)sulfate ($R^{25}$ is hydrogen, each of $R^{26}$ and $R^{27}$ is phenyl, $Y^6$ is 1,1-diphenyl-2-propynyl, and x is 1)

Methyl 2-propynyl sulfate (each of $R^{25}$, $R^{26}$ and $R^{27}$ is hydrogen, $Y^6$ is methyl, and x is 1)

Methyl 1-methyl-2-propynyl sulfate ($R^{25}$ is hydrogen, $R^{26}$ is methyl, $R^{27}$ is hydrogen, $Y^6$ is methyl, and x is 1)

Ethyl 2-propynyl sulfate (each of $R^{25}$, $R^{26}$ and $R^{27}$ is hydrogen, $Y^6$ is ethyl, and x is 1)

Phenyl 2-propynyl sulfate (each of $R^{25}$, $R^{26}$ and $R^{27}$ is hydrogen, $Y^6$ is phenyl, and x is 1)

Cyclohexyl 2-propynyl sulfate (each of $R^{25}$, $R^{26}$ and $R^{27}$ is hydrogen, $Y^6$ is cyclohexyl, and x is 1)

(3) W is oxalyl

Di (2-propynyl)oxalate (each of $R^{25}$, $R^{26}$ and $R^{27}$ is hydrogen, $Y^6$ is 2-propynyl, and x is 1)

Bis(1-methyl-2-propynyl)oxalate ($R^{25}$ is hydrogen, $R^{26}$ is methyl, $R^{27}$ is hydrogen, $Y^6$ is 1-methyl-2-propynyl, and x is 1)

Di(2-butynyl)oxalate ($R^{25}$ is methyl, each of $R^{26}$ and $R^{27}$ is hydrogen, $Y^6$ is 2-butynyl, and x is 1)

Di(3-butynyl)oxalate (each of $R^{25}$, $R^{26}$ and $R^{27}$ is hydrogen, $Y^6$ is 3-butynyl, and x is 2)

Di(2-pentynyl)oxalate ($R^{25}$ is ethyl, each of $R^{26}$ and $R^{27}$ is hydrogen, $Y^6$ is 2-pentynyl, and x is 1)

Bis(1-methyl-2-butynyl)oxalate (each of $R^{25}$ and $R^{26}$ is methyl, $R^{27}$ is hydrogen, $Y^6$ is 1-methyl-2-butynyl, and x is 1)

Bis(1,1-dimethyl-2-propynyl)oxalate ($R^{25}$ is hydrogen, each of $R^{26}$ and $R^{27}$ is methyl, $Y^6$ is 1,1-dimethyl-2-propynyl, and x is 1)

Bis(1,1-diethyl-2-propynyl)oxalate ($R^{25}$ is hydrogen, each of $R^{26}$ and $R^{27}$ is ethyl, $Y^6$ is 1,1-diethyl-2-propynyl, and x is 1)

Bis(1-ethyl-1-methyl-2-propynyl)oxalate ($R^{25}$ is hydrogen, $R^{26}$ is ethyl, $R^{27}$ is methyl, $Y^6$ is 1-ethyl-1-methyl-2-propynyl, and x is 1)

Bis(1-isobutyl-1-methyl-2-propynyl)oxalate ($R^{25}$ is hydrogen, $R^{26}$ is isobutyl, $R^{27}$ is methyl, $Y^6$ is 1-isobutyl-1-methyl-2-propynyl, and x is 1)

Bis(1,1-dimethyl-2-butynyl)oxalate (each of $R^{25}$, $R^{26}$ and $R^{27}$ is methyl, $Y^6$ is 1,1-dimethyl-2-butynyl, and x is 1)

Bis(1-ethynylcyclohexyl)oxalate ($R^{25}$ is hydrogen, combination of $R^{26}$ and $R^{27}$ is pentamethylene, $Y^6$ is 1-ethynylcyclohexyl, and x is 1)

Bis(1-methyl-1-phenyl-2-propynyl)oxalate ($R^{25}$ is hydrogen, $R^{26}$ is phenyl, $R^{27}$ is methyl, $Y^6$ is 1-methyl-1-phenyl-2-propynyl, and x is 1)

Bis(1,1-diphenyl-2-propynyl)oxalate ($R^{25}$ is hydrogen, each of $R^{26}$ and $R^{27}$ is phenyl, $Y^6$ is 1,1-diphenyl-2-propynyl, and x is 1)

Methyl 2-propynyl oxalate (each of $R^{25}$, $R^{26}$ and $R^{27}$ is hydrogen, $Y^6$ is methyl, and x is 1)

Methyl 1-methyl-2-propynyl oxalate ($R^{25}$ is hydrogen, $R^{26}$ is methyl, $R^{27}$ is hydrogen, $Y^6$ is methyl, and x is 1)

Ethyl 2-propynyl oxalate (each of $R^{25}$, $R^{26}$ and $R^{27}$ is hydrogen, $Y^6$ is ethyl, and x is 1)

Phenyl 2-propynyl oxalate (each of $R^{25}$, $R^{26}$ and $R^{27}$ is hydrogen, $Y^6$ is phenyl, and x is 1)

Cyclohexyl 2-propynyl oxalate (each of $R^{25}$, $R^{26}$ and $R^{27}$ is hydrogen, $Y^6$ is cyclohexyl, and x is 1)

Examples of the alkyne compound represented by the formula (VII) are shown below.

2-Pentyne ($R^{28}$ is methyl, $R^{29}$ is ethyl, and p is 1)
1-Hexyne ($R^{28}$ is butyl, $R^{29}$ is hydrogen, and p is 1)
2-Hexyne ($R^{28}$ is propyl, $R^{29}$ is methyl, and p is 1)
3-Hexyne (each of $R^{28}$ and $R^{29}$ is ethyl, and p is 1)
1-Heptyne ($R^{28}$ is pentyl, $R^{29}$ is hydrogen, and p is 1)
1-Octyne ($R^{28}$ is hexyl, $R^{29}$ is hydrogen, and p is 1)
2-Octyne ($R^{28}$ is methyl, $R^{29}$ is pentyl, and p is 1)
4-Octyne (each of $R^{28}$ and $R^{29}$ is propyl, and p is 1)
1-Decyne ($R^{28}$ is octyl, $R^{29}$ is hydrogen, and p is 1)
1-Dodecyne ($R^{28}$ is decyl, $R^{29}$ is hydrogen, and p is 1)
Phenylacetylene ($R^{28}$ is phenyl, $R^{29}$ is hydrogen, and p is 1)
1-Phenyl-1-propyne ($R^{28}$ is phenyl, $R^{29}$ is methyl, and p is 1)
1-Phenyl-1-butyne ($R^{28}$ is phenyl, $R^{29}$ is ethyl, and p is 1)
1-Phenyl-1-pentyne ($R^{28}$ is phenyl, $R^{29}$ is propyl, and p is 1)
1-Phenyl-1-hexyne ($R^{28}$ is phenyl, $R^{29}$ is butyl, and p is 1)
Diphenylacetylene (each of $R^{28}$ and $R^{29}$ is phenyl, and p is 1)
4-Ethynyltoluene ($R^{28}$ is p-tolyl, $R^{29}$ is hydrogen, and p is 1)
4-Tert-butylphenylacetylene ($R^{28}$ is 4-tertbutylphenyl, $R^{29}$ is hydrogen, and p is 1)
1-Ethynyl-4-fluorobenzene ($R^{28}$ is p-fluorophenyl, $R^{29}$ is hydrogen, and p is 1)
1,4-Diethynylbenzene ($R^{28}$ is p-ethynylphenyl, $R^{29}$ is hydrogen, and p is 1)
Dicyclohexylacetylene (each of $R^{28}$ and $R^{29}$ is cyclohexyl, and p is 1)
1,4-Diphenylbutadiyne (each of $R^{28}$ and $R^{29}$ is phenyl, and p is 2)

An excess amount of the alkyne compound contained in the non-aqueous electrolytic solution might change conductivity of the electrolytic solution to lower battery performance. The electrolytic solution contains the alkyne compound preferably in an amount of 10 wt. % or less, more preferably in an amount of 5 wt. % or less, and most preferably in an amount of 3 wt. % or less. On the other hand, it is difficult to form a film from an extremely small amount of the alkyne compound. Therefore, shortage of the alkyne compound might cause insufficient battery performance. The electrolytic solution contains the alkyne compound preferably in an amount of 0.01 wt. % or more, more preferably in an amount of 0.05 wt. % or more, and most preferably in an amount of 0.1 wt. % or more. Accordingly, the non-aqueous electrolytic solution contains the alkyne compound preferably in an amount of 0.01 to 10 wt. %, more preferably in an amount of 0.05 to 5 wt. %, and most preferably in an amount of 0.1 to 3 wt. %.

Examples of the non-aqueous solvent used in the non-aqueous electrolytic solution according to the present invention include: cyclic carbonates such as ethylene carbonate (EC), propylene carbonate (PC), butylene carbonate (BC), vinylethylene carbonate (VEC); lactones such as γ-butyrolactone (GBL), γ-valerolactone (GVL), α-angelica lactone (AGL); chain carbonates such as dimethyl carbonate (DMC), methyl ethyl carbonate (NEC), diethyl carbonate (DEC), methyl propyl carbonate (MPC), dipropyl carbonate (DPC), methyl butyl carbonate (MBC), dibutyl carbonate (DBC); ethers such as tetrahydrofuran, 2-methyltetrahydrofuran, 1,4-dioxane, 1,2-dimethoxyethane, 1,2-diethoxyethane, 1,2-dibutoxyethane; nitriles such as acetonitrile, adiponitrile; chain esters such as methyl propionate, methyl pivalate, butyl pivalate, octyl pivalate; amides such as dimethylformamide; phosphoric esters such as trimethyl phosphate, trioctyl phosphate; and compounds having a structure of S=O such as 1,3-propanesultone, 1,4-propanesultone, divinyl sulfone, tetramethylene bis(methanesulfonate), ethylene sulfite, propylene sulfite, ethylene sulfate, propylene sulfate.

Examples of combination of the non-aqueous solvents include various combinations such as a combination of a cyclic carbonate and a chain carbonate, a combination of a cyclic carbonate and a lactone, a combination of a cyclic carbonate, a lactone and a chain ester, a combination of a cyclic carbonate, a chain carbonate and a lactone, a combination of a cyclic carbonate, a chain carbonate and an ether, and a combination of a cyclic carbonate, a chain carbonate and a chain ester. The combination of the cyclic carbonate and the chain carbonate, or the combination of the cyclic carbonate, the lactone and the chain carbonate is preferred. The volume ratio of the cyclic carbonate to the chain carbonate is preferably in the range of 1:9 to 10:0, and more preferably in the range of 2:8 to 7:3.

Examples of the electrolyte salt used in the non-aqueous electrolytic solution include: $LiPF_6$; $LiBF_4$; $LiClO_4$; lithium salts comprising a chain alkyl group such as $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$; and lithium salts comprising a cyclic alkylene group such as $(CF_2)_2(SO_2)_2NLi$, $(CF_2)_3(SO_2)_2NLi$. Only one electrolyte salt can be used in the solution. Further, two or more electrolyte salts can be used in combination. The concentration of the electrolyte salts dissolved in the non-aqueous medium is preferably of 0.3 M or more, more preferably of 0.5 M or more, and most preferably of 0.7 M or more. The concentration is preferably of 3 M or less, more preferably of 2.5 M or less, and most preferably of 2 M or less.

The non-aqueous electrolytic solution according to the present invention can be obtained by mixing non-aqueous solvents such as ethylene carbonate, propylene carbonate, methyl ethyl carbonate, dissolving the above-mentioned electrolyte salt in the mixture, and dissolving a vinylene carbonate compound and an alkyne compound in the solution.

The non-aqueous electrolytic solution according to the present invention can contain the air or carbon dioxide to inhibit generation of a gas caused by decomposition of the electrolytic solution and to improve battery performance such as cycle and storage characteristics.

Carbon dioxide or the air can be contained (dissolved) in the non-aqueous electrolytic solution in the present invention according to a method (1) of contacting the non-aqueous electrolytic solution to the air or a gas containing carbon dioxide to introduce the air or the gas into the solution, and then injecting the solution into the battery, or a method of (2) injecting the non-aqueous electrolytic solution into the battery, and then introducing the air or a gas containing carbon dioxide into the battery before or after sealing the battery. The two methods can be used in combination. The amount of the moisture contained in the air or the gas containing carbon dioxide is preferably small as possible. The amount of the moisture is so reduced that the due point of the air or the gas is lower than 40° C., and more preferably lower than −50° C.

The non-aqueous electrolytic solution according to the present invention can further contain an aromatic compound to secure safety of the battery from excessive charge. Examples of the aromatic compound include cyclohexylbenzene, a fluorocyclohexylbenzene compound (e.g., 1-fluoro-2-cyclohexylbenzene, 1-fluoro-3-cyclohexylbenzene, 1-fluoro-4-cyclohexylbenzene), biphenyl, terphenyl (o-, m-, p-), diphenyl ether, 2-fluorophenyl phenyl ether, 4-fluorophenyl phenyl ether, fluorobenzene, difluorobenzene (o-, m-, p-), 2-fluorobiphenyl, 4-fluorobiphenyl, 2,4-difluoroanisole, tert-butylbenzene, 1,3-di-tert-butylbenzene, 1-fluoro-4-tert-butylbenzene, tert-pentylbenzene, 4-tertbutylbiphenyl, tert-pentylbiphenyl, a partially hydrogenated o-terphenyl (such as 1,2-dicyclohexylbenzene, 2-phenylbicyclohexyl, 1,2-diphenylcyclohexane, o-cyclohexylbiphenyl), a partially hydrogenated m-terphenyl (examples analogous to the examples of the partially hydrogenated o-terphenyl) and a partially hydrogenated p-terphenyl (examples analogous to the examples of the partially hydrogenated o-terphenyl). The non-aqueous electrolytic solution contains the aromatic compound preferably in an amount of 0.1 to 5 wt. %.

Two or more aromatic compounds can be used in combination. Examples of the combination include biphenyl and cyclohexylbenzene, cyclohexylbenzene and tert-butylbenzene, cyclohexylbenzene and tert-pentylbenzene, biphenyl and fluorobenzene, cyclohexylbenzene and fluorobenzene, 2,4-difluoroanisole and cyclohexylbenzene, cyclohexylbenzene and 1-fluoro-4-tert-butylbenzene, cyclohexylbenzene and a fluorocyclohexylbenzene compound, a fluorocyclohexylbenzene compound and fluorobenzene, and 2,4-difluoroanisole and a fluorocyclohexylbenzene compound. The weight mixing ratio is preferably in the range of 50:50 to 10:90, more preferably in the range of 50:50 to 20:80, and most preferably in the range of 50:50 to 25:75. In the non-aqueous electrolytic solution system containing the vinylene carbonate compound and the alkyne compound, at least one aromatic compound preferably is a compound substituted with a fluorine atom. A fluorocyclohexylbenzene compound is particularly preferred.

The non-aqueous electrolytic solution according to the present invention can be used as a part of a secondary battery, particularly a lithium secondary battery. There is no specific limitation with respect to parts of the secondary battery other than the non-aqueous electrolytic solution. Conventional various parts can be used in the secondary battery.

Examples of the active cathode material include a complex metal oxide of lithium with cobalt, manganese or nickel. Only one material can be selected and used as the active cathode material. Further, two or more active cathode materials can be used in combination. Examples of the complex metal oxide include $LiCoO_2$, $LiMn_2O_4$, $LiNiO_2$, $LiCO_{1-x}NixO_2$ (0.01<x<1). Examples of the mixture include $LiCoO_2$ and $LiMn_2O_4$, $LiCoO_2$ and $LiNiO_2$, $LiMn_2O_4$ and $LiNiO_2$. The active cathode material preferably is a complex metal oxide of lithium, such as $LiCoO_2$, $LiMn_2O_4$, $LiNiO_2$. The material more preferably shows voltage of 4.3 V or more when the voltage of an open-circuit is measured using lithium as standard after complete the charge. The cathode material most preferably is a complex metal oxide of lithium containing Co or Ni. A part of a complex metal oxide of lithium can be replaced with another metal. For example, a part of Co contained in $LiCoO_2$ can be replaced with Sn, Mg, Fe, Ti, Al, Zr, Cr, V, Ga, Zn or Cu.

An electroconductive material that does not cause a chemical change can be used as the conductive material for the negative electrode. Examples of the conductive material include graphites such as natural graphite (e.g., scaly graphite), artificial graphite, and carbon blacks such as acetylene black, ketjenblack, channel black, furnace black, lamp black, thermal black. Graphite and carbon black can be used in combination at a certain mixing ratio. The cathode composite contains the conductive material preferably in an amount of 1 to 10 wt. %, and more preferably in an amount of 2 to 5 wt. %.

The positive electrode can be formed by mixing the active cathode material with the conductive material such as acetylene black, carbon black, and a binder to prepare a positive electrode composite material, pressing the positive electrode material on a collecting material, and heating them at a temperature of 50 to 250° C. for about 2 hours under reduced pressure. Examples of the binder include polytetrafluoroethylene (PTFE), polyvinylidene fluoride (PVDF), styrene/butadiene copolymer (SBR), acrylonitrile/butadiene copolymer (NBR), and carboxymethylcellulose (CMC). Examples of the collecting material include aluminum foil and a stainless lath board.

A material capable of absorbing and releasing lithium is used as the negative electrode. Examples of the material include metallic lithium, lithium alloy, a carbon material such as thermally decomposed carbon, coke, graphite (e.g., artificial graphite, natural graphite), a combustion product of an organic polymeric compound, or carbon fiber, tin, a tin compound, silicon, and a silicon compound.

The negative electrode (active anode material) preferably comprises a carbon material having a distance ($d_{002}$) between lattice faces (002) of 0.340 nm or less. The carbon material more preferably is graphite having a graphitic crystal structure with the distance ($d_{002}$) in the range of 0.335 to 0.340 nm. Only one material can be selected and used as the active anode material. Further, two or more active anode materials can be used in combination. A powdery material such as the carbon material can be used as a negative electrode composite material by mixing the material with a binder. Examples of the binder include ethylene/propylene diene interpolymer (EPDM), polytetrafluoroethylene (PTFE), polyvinylidene fluoride (PVDF), styrene/butadiene copolymer (SBR), acrylonitrile/butadiene copolymer (NBR), and carboxymethylcellulose (CMC). There is no specification with respect to the method for forming the negative electrode. The anode can be prepared in the same manner as in the above-mentioned method for forming the positive electrode.

There is no specific limitation with respect to the structure of the lithium secondary battery according to the present invention. Examples of the structure include a coin-shaped battery comprising a positive electrode, a negative electrode and a separator in the form of one or more layers, and a cylindrical or square-shaped battery comprising a positive electrode, a negative electrode and a separator in the form of a roll. A known separator such as a minute porous material, a fabric, and a non-woven fabric can be used in the battery. The minute parous material can be made of polyolefin such as polypropylene, or polyethylene. The separator for the battery can be a single layer of a porous film. The separator can also comprise two or more porous films. The separator for the battery used in the present invention has gas permeability preferably in the range of 50 to 1,000 seconds per 100 cc, more preferably in the range of 100 to 800 seconds per 100 cc, and most preferably in the range of 300 to 500 seconds per 100 cc. In the case that the gas permeability is extremely high, the conductivity of lithium ion is lowered to cause insufficient function as battery separator. In the case that the gas permeability is extremely low, the mechanical strength is degraded. The void volume ratio is preferably in the range of 30 to 60%, more preferably in the range of 35 to 55%, and most preferably in the range of 40 to 50%. The void ratio is so adjusted to improve the battery capacity. The thickness of the separator for the battery is preferably thin to increase the energy density. On the other hand, the mechanical strength and the performance can also be considered about the thickness. The thickness of the separator is preferably in the range of 5 to 50 μm, more preferably in the range of 10 to 40 μm, and most preferably in the range of 15 to 25 μm.

The non-aqueous electrolytic solution according to the present invention is particularly effective in a lithium secondary battery in which a positive electrode and negative electrode composition layers are formed as high density layers. The positive electrode composition layer formed on aluminum foil has a density preferably in the range of 3.2 to 4.0 $g/cm^3$, more preferably in the range of 3.3 to 3.9 $g/cm^3$, and most preferably in the range of 3.4 to 3.8 $g/cm^3$. If the density of the positive electrode is more than 4.0 $g/cm^3$, it is substantially difficult to prepare the battery. The negative electrode composition layer formed on copper foil has a density preferably in the range of 1.3 to 2.0 $g/cm^3$, more preferably in the range of 1.4 to 1.9 $g/cm^3$, and most preferably in the range of 1.5 to 1.8 $g/cm^3$. If the density of the negative electrode is more than 2.0 $g/cm^3$, it is substantially difficult to prepare the battery.

The electrode layer of the positive electrode according to the present invention has a thickness (per one surface of the collector) preferably in the range of 30 to 120 μm, and more preferably in the range of 50 to 100 μm. The electrode layer of the negative electrode according to the present invention has a thickness (per one surface of the collector) preferably in the range of 1 to 100 μm, and more preferably in the range of 3 to 70 μm. If the thickness is smaller than the preferred range, the quantity of an active material in the electrode material layer is lowered to decrease the battery capacity. If the thickness is larger than the preferred range, the cycle characteristics or the rate characteristics are unfavorably degraded.

There is no specific limitation with respect to the structure of the lithium secondary battery. Examples of the structure include a coin-shaped battery, a cylindrical battery, a square-shaped battery and a laminated battery, each of which comprises a positive electrode, a negative electrode, a porous separating membrane and an electrolytic solution.

The lithium secondary battery according to the present invention shows excellent cycle characteristics for a long term even if the final recharging voltage is higher than 4.2 V. The battery further shows excellent cycle characteristics even if the final recharging voltage is higher than 4.3 V. The final discharging voltage can be 2.5 V or more, and further can be 2.8 V or more. There is no specific limitation with respect to the current. The battery is generally discharged with the constant current of 0.1 to 3 C. The lithium secondary battery according to the present invention can be charged and discharged at a temperature of higher than −40° C., and preferably at a temperature of higher than 0° C. The battery can also be charged and discharged at a temperature of lower than 100° C., and preferably at a temperature of lower than 80° C.

A safety valve can be attached to a sealing plate to prevent the inner pressure from increasing in the lithium secondary battery according to the present invention. A part of the battery such as a battery cell (can) or a gasket can be cut to prevent the pressure from increasing. At least one of various conventional safety attachments (for example overcurrent-preventing devices such as a fuse, a bimetal and a PTC element) is preferably attached to the battery.

Two or more lithium secondary batteries according to the present invention can be placed in a battery package while arranging the batteries in series or parallel. A safety circuit (which has functions of monitoring conditions such as voltage, temperature and current in each of the battery or in the combined batteries, and breaking the current) can be attached to the battery package in addition to a safety attachment such as a PTC element, a thermal fuse, a fuse and a current breaker.

EXAMPLES

The present invention is described by referring to the following examples.

Example 1

[Preparation of Non-aqueous Electrolytic Solution]

A non-aqueous solvent of EC:PC:MEC having a volume ratio of 30:5:65 was prepared. In the solvent, $LiPF_6$ was dissolved to prepare a 1 M solution of an electrolyte salt. To the non-aqueous electrolytic solution, 0.1 wt. % of 2-propynyl methyl carbonate (an alkyne compound represented by the formula (II), based on the non-aqueous electrolytic solution) was added. To the solution, 3 wt. % of vinylene carbonate (based on the non-aqueous electrolytic solution) was further added.

(Preparation of Lithium Secondary Battery and Measurement of Battery Performance)

With 94 wt. % of $LiCoO_2$ (active cathode material), 3 wt. % of acetylene black (conductive material) and polyvinylidene fluoride (binder) were mixed. To the mixture, 1-methyl-2-pyrrolidone (solvent) was added. A surface of aluminum foil was coated with the resulting solution. The mixture was dried, molded under pressure, and heated to form a positive electrode composition layer (cathode).

With 95 wt. % of artificial graphite (active anode material) having a graphitic crystalline structure with a distance ($d_{002}$) of 0.335 nm between the lattice between lattice faces (002), 5 wt. % of polyvinylidene fluoride (binder) was mixed. To the mixture, 1-methyl-2-pyrrolidone (solvent) was added. A surface of copper foil was coated with the resulting solution. The mixture was dried, molded under pressure and heated to form a negative electrode composition layer (anode).

The positive electrode, the negative electrode and a separator comprising a micro porous polyethylene film (thickness: 20 μm) were placed in a battery vessel. The non-aqueous electrolytic solution was poured into the battery. The air having the dew point of −60° C. was introduced into the battery, and the battery was sealed to prepare a cylindrical battery having the size of 18650 (diameter: 18 mm, height: 65 mm). A pressure-discharging opening and an inner current breaker (PTC element) were attached to the battery. The positive electrode composition layer has the density of 3.5 g/cm³, and the negative electrode composition layer has the density of 1.6 g/cm³. The positive electrode composition layer has the thickness of 70 μm (per one surface of the collector), and the negative electrode composition layer has the thickness of 60 μm (per one surface of the collector).

The 18650 battery was charged with the constant current of 2.2 A (1C) at a high temperature (60° C.) to reach 4.2 V. The battery was further charged under the constant voltage for 3 hours in total to reach the final voltage of 4.2 V. The battery, was discharged under the constant current of 2.2 A (1C) to reach the final voltage of 3.0 V. The cycle of charge and discharge was repeated. The initial discharging capacity (mAh) was the substantially same as the result using 1M of $LiPF_3$-EC/PC/MEC (volume ratio: 30/5/65) containing no alkyne compound as the non-aqueous electrolytic solution (Comparison Example 1 described below). The battery performance was measured after 300 cycles. The remaining rate of the discharging capacity to the initial discharging capacity (100%) was 79.2%. The initial discharging capacity (relative value) and the remaining rate of the discharging capacity after 300 cycles are set forth in Table 1.

Examples 2-4

Cylindrical batteries having the size of 18650 were prepared in the same manner as in Example 1, except that non-aqueous electrolytic solutions were prepared using 0.5 wt. %, 1 wt. % and 5 wt. % of 2-propynyl methyl carbonate respectively as the additive. The cycle of charge and discharge was tested in the same manner as in Example 1. The initial discharging capacity (relative value) and the remaining rate of the discharging capacity after 300 cycles are set forth in Table 1.

Example 5

A cylindrical battery having the size of 18650 was prepared in the same manner as in Example 1, except that a non-aqueous electrolytic solution was prepared using 1 wt. % of 2-propynyl methyl carbonate and 0.1 wt. % of vinylene carbonate as the additives. The cycle of charge and discharge was tested in the same manner as in Example 1. The initial discharging capacity (relative value) and the remaining rate of the discharging capacity after 300 cycles are set forth in Table 1.

Example 6

A cylindrical battery having the size of 18650 was prepared in the same manner as in Example 1, except that a non-aqueous electrolytic solution was prepared using 1 wt. % of 2-propynyl methyl carbonate and 5 wt. % of vinylene carbonate as the additives. The cycle of charge and discharge was tested in the same manner as in Example 1. The initial discharging capacity (relative value) and the remaining rate of the discharging capacity after 300 cycles are set forth in Table 1.

Comparison Example 1

A cylindrical battery having the size of 18650 was prepared in the same manner as in Example 1, except that a non-aqueous electrolytic solution was prepared using no 2-propynyl methyl carbonate and 3 wt. % of vinylene carbonate as the additives. The cycle of charge and discharge was tested in the same manner as in Example 1. The initial discharging capacity (relative value) and the remaining rate of the discharging capacity after 300 cycles are set forth in Table 1.

Comparison Example 2

A cylindrical battery having the size of 18650 was prepared in the same manner as in Example 1, except that a non-aqueous electrolytic solution was prepared using 3 wt. % of 2-propynyl methyl carbonate and no vinylene carbonate as the additives. The cycle of charge and discharge was tested in the same manner as in Example 1. The initial discharging capacity (relative value) and the remaining rate of the discharging capacity after 300 cycles are set forth in Table 1.

TABLE 1

| Lithium secondary battery | Vinylene carbonate | 2-Propynyl methyl carbonate | Initial discharging capacity | Remaining rate of capacity |
|---|---|---|---|---|
| Example 1 | 3 wt. % | 0.1 wt. % | 1.00 | 79.2% |
| Example 2 | 3 wt. % | 0.5 wt. % | 1.00 | 82.1% |
| Example 3 | 3 wt. % | 1 wt. % | 1.00 | 82.5% |
| Example 4 | 3 wt. % | 5 wt. % | 1.00 | 81.1% |
| Example 5 | 0.1 wt. % | 1 wt. % | 1.00 | 78.3% |
| Example 6 | 5 wt. % | 1 wt. % | 1.00 | 80.1% |
| Comp. Ex. 1 | 3 wt. % | 0 wt. % | 1.00 | 64.3% |
| Comp. Ex. 2 | 0 wt. % | 3 wt. % | 1.00 | 65.8% |

As is evident from the results shown in Table 1, a discharging capacity is kept with a high remaining rate. The excellent cycle characteristics are achieved by adding both of a vinylene carbonate compound and an alkyne compound to a non-aqueous electrolytic solution according to the present invention.

Example 7

A cylindrical battery having the size of 18650 was prepared in the same manner as in Example 1, except that a non-aqueous electrolytic solution was prepared using 1 wt. % of 2-propynyl methanesulfonate (a compound represented by the formula (II)) as the alkyne compound. The cycle of charge and discharge was tested in the same manner as in Example 1. The results are shown below.
Initial discharging capacity (relative value):
  1.00
Remaining rate of discharging capacity after 300 cycles:
  82.7

Example 8

A cylindrical battery having the size of 18650 was prepared in the same manner as in Example 1, except that a non-aqueous electrolytic solution was prepared using 1 wt. % of 2-butynylene bis(methyl carbonate) (a compound represented by the formula (III)) as the alkyne compound. The cycle of charge and discharge was tested in the same manner as in Example 1. The results are shown below.
Initial discharging capacity (relative value):
  100
Remaining rate of discharging capacity after 300 cycles:
  81.3

Example 9

A cylindrical battery having the size of 18650 was prepared in the same manner as in Example 1, except that a non-aqueous electrolytic solution was prepared using 1 wt. % of 2-butynylene bis(methanesulfonate) (a compound represented by the formula (III)) as the alkyne compound. The cycle of charge and discharge was tested in the same manner as in Example 1. The results are shown below.
Initial discharging capacity (relative value):
  1.00
Remaining rate of discharging capacity after 300 cycles:
  81.4

Example 10

A cylindrical battery having the size of 18650 was prepared in the same manner as in Example 1, except that a non-aqueous electrolytic solution was prepared using 1 wt. % of 2,4-hexadiynylene bis(methyl carbonate) (a compound represented by the formula (IV)) as the alkyne compound. The cycle of charge and discharge was tested in the same manner as in Example 1. The results are shown below.
Initial discharging capacity (relative value):
  1.00
Remaining rate of discharging capacity after 300 cycles:
  80.3

Example 11

A cylindrical battery having the size of 18650 was prepared in the same manner as in Example 1, except that a non-aqueous electrolytic solution was prepared using 0.5 wt. % of di(2-propynyl) carbonate (a compound represented by the formula (V)) as the alkyne compound. The cycle of charge and discharge was tested in the same manner as in Example 1. The results are shown below.
Initial discharging capacity (relative value):
  1.00
Remaining rate of discharging capacity after 300 cycles:
  80.5

Example 12

A cylindrical battery having the size of 18650 was prepared in the same manner as in Example 1, except that a non-aqueous electrolytic solution was prepared using 0.5 wt. % of di(2-propynyl)sulfite (a compound represented by the formula (VI)) as the alkyne compound. The cycle of charge and discharge was tested in the same manner as in Example 1. The results are shown below.
Initial discharging capacity (relative value):
  1.00
Remaining rate of discharging capacity after 300 cycles:
  82.5

Example 13

A cylindrical battery having the size of 18650 was prepared in the same manner as in Example 1, except that a non-aqueous electrolytic solution was prepared using 0.2 wt. % of di(2-propynyl)oxalate (a compound represented by the formula (VI)) as the alkyne compound. The cycle of charge and discharge was tested in the same manner as in Example 1. The results are shown below.
Initial discharging capacity (relative value):
  100
Remaining rate of discharging capacity after 300 cycles:
  81.7

Example 14

A cylindrical battery having the size of 18650 was prepared in the same manner as in Example 1, except that a non-aqueous electrolytic solution was prepared using 0.1 wt. % of phenylacetylene (a compound represented by the formula (VII)) as the alkyne compound. The cycle of charge and discharge was tested in the same manner as in Example 1. The results are shown below.
Initial discharging capacity (relative value):
  1.00
Remaining rate of discharging capacity after 300 cycles:
  80.4

Example 15

A cylindrical battery having the size of 18650 was prepared in the same manner as in Example 1, except that a non-aqueous electrolytic solution was prepared using 1 wt. % of 2-propynyl methanesulfonate (a compound represented by the formula (II)) as the alkyne compound, and $LiMn_2O_4$ was used as the positive electrode (active cathode material) in place of $LiCoO_2$. The cycle of charge and discharge was tested in the same manner as in Example 1. The results are shown below.

Initial discharging capacity (relative value):
0.87
Remaining rate of discharging capacity after 300 cycles:
80.8

Example 16

A non-aqueous solvent of EC:DMC:DEC having a volume ratio of 30:20:50 was prepared. In the solvent, $LiPF_6$ and $LiN(SO_2CF_3)_2$ were dissolved to prepare a solution of electrolyte salts having the concentrations of 0.9 M and 0.1 M respectively. To the non-aqueous electrolytic solution, 1 wt. % of 1,3-propanesultone (PS, based on the non-aqueous electrolytic solution) and 2 wt. % of cyclohexylbenzene (CHB, based on the non-aqueous electrolytic solution) were added. To the non-aqueous electrolytic solution, 1 wt. % of 2-propynyl methyl carbonate (an alkyne compound represented by the formula (II), based on the non-aqueous electrolytic solution) and 1 wt. % of vinylene carbonate (based on the non-aqueous electrolytic solution) were further added as the additives.

A cylindrical battery having the size of 18650 was prepared in the same manner as in Example 1, except that the above-prepared non-aqueous electrolytic solution was used. The cycle of charge and discharge was tested in the same manner as in Example 1. The results are shown below.

Initial discharging capacity (relative value):
1.00
Remaining rate of discharging capacity after 300 cycles:
82.2

Example 17

A non-aqueous solvent of EC:DMC:DEC having a volume ratio of 30:20:50 was prepared. In the solvent, $LiPF_6$ was dissolved to prepare a solution of an electrolyte salt having the concentration of 1 M. To the non-aqueous electrolytic solution, 0.5 wt. % of biphenyl (BP, based on the non-aqueous electrolytic solution) and 2 wt. % of cyclohexylbenzene (CHB, based on the non-aqueous electrolytic solution) were added. To the non-aqueous electrolytic solution, 0.5 wt. % of di(2-propynyl)sulfite (an alkyne compound represented by the formula (VI), based on the non-aqueous electrolytic solution) and 1 wt. % of vinylene carbonate (based on the non-aqueous electrolytic solution) were further added as the additives.

A cylindrical battery having the size of 18650 was prepared in the same manner as in Example 1, except that the above-prepared non-aqueous electrolytic solution was used. The cycle of charge and discharge was tested in the same manner as in Example 1. The results are shown below.

Initial discharging capacity (relative value):
100
Remaining rate of discharging capacity after 300 cycles:
81.1

Example 18

A non-aqueous solvent of EC:DMC:DEC having a volume ratio of 30:20:50 was prepared. In the solvent, $LiPF_6$ was dissolved to prepare a solution of an electrolyte salt having the concentration of 1 M. To the non-aqueous electrolytic solution, 1 wt. % of tert-butylbenzene (TBB, based on the non-aqueous electrolytic solution) and 1 wt. % of cyclohexylbenzene (CHB, based on the non-aqueous electrolytic solution) were added. To the non-aqueous electrolytic solution, 0.5 wt. % of di(2-propynyl)sulfite (an alkyne compound represented by the formula (VI), based on the non-aqueous electrolytic solution) and 1 wt. % of vinylene carbonate (based on the non-aqueous electrolytic solution) were further added as the additives.

A cylindrical battery having the size of 18650 was prepared in the same manner as in Example 1, except that the above-prepared non-aqueous electrolytic solution was used. The cycle of charge and discharge was tested in the same manner as in Example 1. The results are shown below.

Initial discharging capacity (relative value):
1.00
Remaining rate of discharging capacity after 300 cycles:
81.4

Example 19

A non-aqueous solvent of EC:DMC:DEC having a volume ratio of 30:20:50 was prepared. In the solvent, $LiPF_6$ was dissolved to prepare a solution of an electrolyte salt having the concentration of 1 M. To the non-aqueous electrolytic solution, 1 wt. % of tert-pentylbenzene (TPB, based on the non-aqueous electrolytic solution) and 1 wt. % of cyclohexylbenzene (CHB, based on the non-aqueous electrolytic solution) were added. To the non-aqueous electrolytic solution, 0.5 wt. % of di(2-propynyl)sulfite (an alkyne compound represented by the formula (VI), based on the non-aqueous electrolytic solution) and 1 wt. % of vinylene carbonate (based on the non-aqueous electrolytic solution) were further added as the additives.

A cylindrical battery having the size of 18650 was prepared in the same manner as in Example 1, except that the above-prepared non-aqueous electrolytic solution was used. The cycle of charge and discharge was tested in the same manner as in Example 1. The results are shown below.

Initial discharging capacity (relative value):
1.00
Remaining rate of discharging capacity after 300 cycles:
81.8

Example 20

(Preparation of Non-Aqueous Electrolytic Solution)

A non-aqueous solvent of EC:MEC having a volume ratio of 30:70 was prepared. In the solvent, $LiPF_6$ was dissolved to prepare a 1 M solution of an electrolyte salt. To the non-aqueous electrolytic solution, 0.3 wt. % of di(2-propynyl) oxalate (an alkyne compound represented by the formula (VI), based on the non-aqueous electrolytic solution) was added. To the solution, 2 wt. % of vinylene carbonate (based on the non-aqueous electrolytic solution) was further added. To the solution, 1 wt. % of cyclohexylbenzene (CHB, based on the non-aqueous electrolytic solution) and 3 wt. % of 1-fluoro-4-cyclohexylbenzene (FCHB, based on the non-aqueous electrolytic solution) were furthermore added.

(Preparation of Lithium Secondary Battery and Measurement of Battery Performance)

With 94 wt. % of LiCoO$_2$ (active cathode material), 3 wt. % of graphite (conductive material) and polyvinylidene fluoride (binder) were mixed. To the mixture, 1-methyl-2-pyrrolidone (solvent) was added. A surface of aluminum foil was coated with the resulting solution. The mixture was dried, molded under pressure, and heated to form a positive electrode composition layer (cathode).

With 95 wt. % of artificial graphite (active anode material) having a graphitic crystalline structure with a distance ($d_{002}$) of 0.335 nm between the lattice between lattice faces (002), 5 wt. % of polyvinylidene fluoride (binder) was mixed. To the mixture, 1-methyl-2-pyrrolidone (solvent) was added. A surface of copper foil was coated with the resulting solution. The mixture was dried, molded under pressure and heated to form a negative electrode composition layer (anode).

The positive electrode, the negative electrode and a separator comprising a micro porous polyethylene film (thickness: 20 μm) were placed in a battery vessel. The non-aqueous electrolytic solution was poured into the battery. Carbon dioxide having the dew point of –60° C. was introduced into the battery, and the battery was sealed to prepare a cylindrical battery having the size of 18650 (diameter: 18 mm, height: 65 mm). A pressure-discharging opening and an inner current breaker (PTC element) were attached to the battery. The positive electrode composition layer has the density of 3.5 g/cm$^3$, and the negative electrode composition layer has the density of 1.6 g/cm$^3$. The positive electrode composition layer has the thickness of 70 μm (per one surface of the collector), and the negative electrode composition layer has the thickness of 60 μm (per one surface of the collector).

The 18650 battery was charged with the constant current of 2.2 A (1C) at a high temperature (60° C.) to reach 4.2 V. The battery was further charged under the constant voltage for 3 hours in total to reach the final voltage of 4.2 V. The battery was discharged under the constant current of 2.2 A (1C) to reach the final voltage of 3.0 V. The cycle of charge and discharge was repeated. The initial discharging capacity (mAh) was the substantially same (1.01) as the result using 1M of LiPF$_6$-EC/PC/MEC (volume ratio: 30/5/65) containing no alkyne compound as the non-aqueous electrolytic solution (Comparison Example 1 described above). The battery performance was measured after 300 cycles. The remaining rate of the discharging capacity to the initial discharging capacity (100%) was 82.5%.

After the cycle test was repeated five times, the 18650 battery was fully charged to reach 4.2V at the or dinary temperature (20° C.), and further charged with the constant current of 2.2 A (1C) for 2 hours to conduct an excessive charge test. The temperature on the surface of the battery was lower than 120° C., which is the standard highest temperature for safety.

Example 21

A cylindrical battery having the size of 18650 was prepared in the same manner as in Example 20, except that a non-aqueous electrolytic solution was prepared using 4 wt. % of fluorobenzene (FB) in place of 1-fluoro-4-cyclohexylbenzene (FCHB) as the additive. The cycle test of charge and discharge and the excessive charge test were conducted in the same manner as in Example 20. The results are shown below.
Initial discharging capacity (relative value):
 1.01
Remaining rate of discharging capacity after 300 cycles:
 82.1
Surface temperature of battery in excessive charge test:
 lower than 120° C.

Example 22

A cylindrical battery having the size of 18650 was prepared in the same manner as in Example 20, except that a non-aqueous electrolytic solution was prepared using 1 wt. % of 1-fluoro-4-cyclohexylbenzene (FCHB) and 4 wt. % of fluorobenzene (FB) in place of cyclohexylbenzene (CHB) as the additives. The cycle test of charge and discharge and the excessive charge test were conducted in the same manner as in Example 20. The results are shown below.
Initial discharging capacity (relative value):
 1.01
Remaining rate of discharging capacity after 300 cycles:
 82.2
Surface temperature of battery in excessive charge test:
 lower than 120° C.

Example 23

A cylindrical battery having the size of 18650 was prepared in the same manner as in Example 20, except that a non-aqueous electrolytic solution was prepared using 1.5 wt. % of cyclohexylbenzene (CHB) and 1 wt. % of 2,4-difluoroanisole (DFA) in place of 1-fluoro-4-cyclohexylbenzene (FCHB) as the additives. The cycle test of charge and discharge and the excessive charge test were conducted in the same manner as in Example 20. The results are shown below.
Initial discharging capacity (relative value):
 1.01
Remaining rate of discharging capacity after 300 cycles:
 81.5
Surface temperature of battery in excessive charge test:
 lower than 120° C.

Example 24

A cylindrical battery having the size of 18650 was prepared in the same manner as in Example 20, except that a non-aqueous electrolytic solution was prepared using 2 wt. % of 1-fluoro-4-cyclohexylbenzene (FCHB) and 1 wt. % of 2,4-difluoroanisole (DFA) in place of cyclohexylbenzene (CHB) as the additives. The cycle test of charge and discharge and the excessive charge test were conducted in the same manner as in Example 20. The results are shown below.
Initial discharging capacity (relative value):
 1.01
Remaining rate of discharging capacity after 300 cycles:
 81.9
Surface temperature of battery in excessive charge test:
 lower than 120° C.

Example 25

A cylindrical battery having the size of 18650 was prepared in the same manner as in Example 20, except that a non-aqueous electrolytic solution was prepared using 0.4 wt. % of ethylene sulfite (ES) in addition to di(2-propynyl)oxalate (an alkyne compound represented by the formula (VI)), vinylene carbonate (VC), cyclohexylbenzene (CHB) and 1-fluoro-4-cyclohexylbenzene (FCHB) as the additives. The cycle test of charge and discharge and the excessive charge test were conducted in the same manner as in Example 20. The results are shown below.

Initial discharging capacity (relative value):
1.01
Remaining rate of discharging capacity after 300 cycles:
82.6
Surface temperature of battery in excessive charge test:
lower than 120° C.

Example 26

A cylindrical battery having the size of 18650 was prepared in the same manner as in Example 20, except that a non-aqueous electrolytic solution was prepared using 0.3 wt. % of di(2-propynyl)oxalate, 0.3 wt. % of di(2-propynyl)sulfite, 2 wt. % of vinylene carbonate (VC), 1 wt. % of tert-pentylbenzene (TPB) and 3 wt. % of 1-fluoro-4-cyclohexylbenzene (FCHB) as the additives. The cycle test of charge and discharge and the excessive charge test were conducted in the same manner as in Example 20. The results are shown below.
Initial discharging capacity (relative value):
1.01
Remaining rate of discharging capacity after 300 cycles:
83.2
Surface temperature of battery in excessive charge test:
lower than 120° C.

Example 27

A non-aqueous solvent of EC:PC:DMC:DEC having a volume ratio of 30:5:15:50 was prepared. In the solvent, LiPF$_6$ was dissolved to prepare a 1 M solution of an electrolyte salt. To the non-aqueous electrolytic solution, 0.5 wt. % of 2-propynyl formate (an alkyne compound represented by the formula (II), based on the non-aqueous electrolytic solution) and 2 wt. % of vinylene carbonate (based on the non-aqueous electrolytic solution) was added.
A cylindrical battery having the size of 18650 was prepared in the same manner as in Example 20, except that the non-aqueous electrolytic solution was used. The cycle test of charge and discharge and the excessive charge test were conducted in the same manner as in Example 20. The results are shown below.
Initial discharging capacity (relative value):
1.00
Remaining rate of discharging capacity after 300 cycles:
82.4
Surface temperature of battery in excessive charge test:
lower than 120° C.

Example 28

A cylindrical battery having the size of 18650 was prepared in the same manner as in Example 27, except that a non-aqueous electrolytic solution was prepared using 0.5 wt. % of 2-butynylene diformate (a compound represented by the formula (III)). The cycle test of charge and discharge and the excessive charge test were conducted in the same manner as in Example 20. The results are shown below.
Initial discharging capacity (relative value):
1.00
Remaining rate of discharging capacity after 300 cycles:
82.0
Surface temperature of battery in excessive charge test:
lower than 120° C.

Example 29

A cylindrical battery having the size of 18650 was prepared in the same manner as in Example 27, except that a non-aqueous electrolytic solution was prepared using 0.5 wt. % of 2,4-hexadiynylene diformate (a compound represented by the formula (IV)). The cycle test of charge and discharge and the excessive charge test were conducted in the same manner as in Example 20. The results are shown below.
Initial discharging capacity (relative value):
1.00
Remaining rate of discharging capacity after 300 cycles:
81.4
Surface temperature of battery in excessive charge test:
lower than 120° C.

What is claimed is:

1. A non-aqueous electrolytic solution comprising an electrolyte salt in a non- aqueous solvent which comprises a cyclic carbonate selected from the group consisting of ethylene carbonate and propylene carbonate and a chain carbonate for a lithium secondary battery, wherein the non-aqueous electrolytic solution further contains a vinylene carbonate compound represented by the formula (I) in an amount of 0.05 to 5 wt. %, and at least one alkyne compound selected from the group consisting of 2-butynylene bis(methanesulfonate) and di(2-propynyl) oxalate in an amount of 0.1 to 3 wt. %:

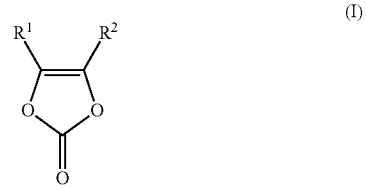

(I)

in which each of $R^1$ and $R^2$ is a hydrogen atom.

2. The non-aqueous electrolytic solution of claim 1, wherein the non-aqueous electrolytic solution contains the vinylene carbonate compound in an amount of 0.1 to 3 wt. %.

3. The non-aqueous electrolytic solution of claim 1, wherein the non-aqueous electrolytic solution further contains an aromatic compound in an amount of 0.1 to 5 wt. %, said aromatic compound being selected from the group consisting of cyclohexylbenzene, a fluorocyclohexylbenzene compound, biphenyl, terphenyl, diphenyl ether, 2-fluorophenyl phenyl ether, 4-fluorophenyl phenyl ether, fluorobenzene, difluorobenzene, 2-fluorobiphenyl, 4-fluorobiphenyl, 2,4-difluoroanisole, tert-butylbenzene, 1,3-di-tert-butylbenzene, 1-fluoro-4-tert-butylbenzene, tert-pentylbenzene, tert-butyl biphenyl, tert-pentyl biphenyl, a partially hydrogenated o-terphenyl, a partially hydrogenated m-terphenyl and a partially hydrogenated p-terphenyl.

4. The non-aqueous electrolytic solution of claim 1, wherein the non-aqueous electrolytic solution further contains a mixture having a weight ratio of 50:50 to 10:90 in a total amount of 0.1 to 5 wt. %, said mixture being selected from the group consisting of a mixture of biphenyl and cyclohexylbenzene, a mixture of cyclohexylbenzene and tert butylbenzene, a mixture of cyclohexylbenzene and tert-pentylbenzene, a mixture of biphenyl and fluorobenzene, a mixture of cyclohexylbenzene and fluorobenzene, a mixture of 2,4-difluoroanisole and cyclohexylbenzene, a mixture of cyclohexylbenzene and 1-fluoro-4-tert butylbenzene, a mixture of cyclohexylbenzene and a fluorocyclohexylbenzene compound, a mixture of a fluorocyclohexylbenzene compound and fluorobenzene, and a mixture of 2,4-difluoroanisole and a fluorocyclohexylbenzene compound.

* * * * *